US011473996B2

(12) United States Patent
Weiler

(10) Patent No.: US 11,473,996 B2
(45) Date of Patent: Oct. 18, 2022

(54) REMOTE PNEUMATIC TESTING SYSTEM

(71) Applicant: Dysruptek LLC, Jacksonville, FL (US)

(72) Inventor: Gary Weiler, Clover, SC (US)

(73) Assignee: Dysruptek LLC, Jacksonville, FL (US)

( * ) Notice: Subject to any disclaimer, the term of this patent is extended or adjusted under 35 U.S.C. 154(b) by 0 days.

(21) Appl. No.: 17/577,294

(22) Filed: Jan. 17, 2022

(65) Prior Publication Data

US 2022/0283051 A1 Sep. 8, 2022

Related U.S. Application Data

(60) Provisional application No. 63/157,252, filed on Mar. 5, 2021.

(51) Int. Cl.
*G01M 3/06* (2006.01)
*G01M 3/28* (2006.01)
(Continued)

(52) U.S. Cl.
CPC ........... *G01M 3/2815* (2013.01); *G08B 13/22* (2013.01); *G08B 21/182* (2013.01)

(58) Field of Classification Search
CPC ...... G01M 3/2815; G01M 3/28; G01M 3/366; G01M 5/0025; G01M 5/0033; G01M 5/0058; G08B 13/22; G08B 21/182; E03B 7/075; E03B 11/02; E03B 11/10; F16L 1/028; F16L 2201/30; F16L 2201/60; F17D 5/02; G01N 3/12
(Continued)

(56) References Cited

U.S. PATENT DOCUMENTS 3,782,168 A 1/1974 Wailes
6,935,163 B2 8/2005 Stewart et al.
(Continued)

FOREIGN PATENT DOCUMENTS

CN 109578816 A 4/2019
EP 2927665 A1 10/2015
(Continued)

OTHER PUBLICATIONS

Waterword, "Gutermann launches world's first NB-IoT-based water leak detection technology," Dec. 2, 2019, https://www.waterworld.com/technologies/flow-level-pressure-measurement/article/14072906/gutermann-launches-worlds-first-nbiotbased-water-leak-detection-technology; 5 pgs.
(Continued)

*Primary Examiner* — Anh V La
(74) *Attorney, Agent, or Firm* — Bekiares Eliezer LLP

(57) ABSTRACT

A method for remote pneumatic testing of a piping system is described. A system administering the method may perform a safety check of the piping system. Following the safety check, the system may verify a digital connection between a remote control system and the piping system, and verify a mechanical connection between a pressure source and the piping system. The system may remotely control the disbursement of fluid from the pressure source into the piping system to apply pressure to the piping system. The system may remotely monitor the pressure applied to the piping system, and may determine that a target pressure to a piping system is reached. Responsive to determining that the target pressure is reached, the system may cause a leak check to be performed.

15 Claims, 7 Drawing Sheets

(51) Int. Cl.
*G08B 13/22* (2006.01)
*G08B 21/18* (2006.01)

(58) Field of Classification Search
USPC ....... 73/40.5 R; 340/506, 603, 605, 606, 614
See application file for complete search history.

(56) References Cited

U.S. PATENT DOCUMENTS

| | | | |
|---|---|---|---|
| 8,146,428 | B2 | 4/2012 | Lavergne |
| 10,094,095 | B2 | 10/2018 | Enev et al. |
| 10,190,298 | B2 | 1/2019 | Slate |
| 10,330,560 | B2 | 6/2019 | Yung |
| 10,352,814 | B2 | 7/2019 | Enev et al. |
| 10,359,336 | B2 | 7/2019 | Bagasra |
| 10,748,427 | B1* | 8/2020 | Aljuaid ............... G08G 1/0969 |
| 2014/0288858 | A1* | 9/2014 | Franklin ............ G01M 3/2815 702/51 |
| 2015/0348395 | A1* | 12/2015 | Trout .................. G08B 21/20 340/605 |
| 2016/0356666 | A1 | 12/2016 | Bilal et al. |
| 2020/0271500 | A1 | 7/2020 | Croteau |
| 2020/0370991 | A1 | 11/2020 | Banerjee et al. |
| 2021/0063271 | A1* | 3/2021 | Mazrooee ........... G01M 3/2892 |
| 2021/0372094 | A1* | 12/2021 | Ai-Muslim ............ G01N 3/12 |

FOREIGN PATENT DOCUMENTS

| | | |
|---|---|---|
| KR | 20050023062 A | 3/2005 |
| KR | 100606635 B1 | 8/2006 |
| KR | 101666773 B1 | 10/2016 |
| WO | 12159184 A1 | 11/2012 |

OTHER PUBLICATIONS

O. Ibitoye et al., "A Convolutional Neural Network Based Solution for Pipeline Leak Detection," Recruit Researchers, Oct. 2019, Conference: 2019 IEEE International Conference on Wireless for Space and Extreme Environments (WiSEE), Ottawa, ON, Canada, https://www.researchgate.net/publication/337060339_A_Convolutional_Neural_Network_Based_Solution_for_Pipeline_Leak_Detection; 5 pgs.
N. H. Saeed et al., "IoT Leak Detection System for Building Hydronic Pipes," Recruit Researchers, Oct. 2019, International Journal of Engineering and Manufacturing 9(5):1-21, https://www.researchgate.net/publication/342529810_IoT_Leak_Detection_System_for_Building_Hydronic_Pipes, 9 pgs.
International Search Report and Written Opinion dated Apr. 4, 2022 cited in Application No. PCT/US2022/016247, 7 pgs.

* cited by examiner

REMOTE PNEUMATIC TESTING SYSTEM

RELATED APPLICATION

Under provisions of 35 U.S.C. § 119(e), the Applicant claims benefit of U.S. Provisional Application No. 63/157,252 filed on Mar. 5, 2021, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to pneumatic testing of piping systems.

BACKGROUND

Pneumatic testing is the process of introducing pressure to a piping system using an inert gas (i.e., a gas that does not undergo chemical reactions under a set of given conditions such as noble gases). Pneumatic testing is performed to determine the leak tightness of a pipe system and the strength of the components within the system. By way of non-limiting reference, American Society of Mechanical Engineers (ASME) B31.3 stipulates a pneumatic test pressure of 110% of design pressure and a pressure relief device must be installed and set so that the test pressure will exceed only the lesser of 345 kPa (50 psi) or 10% of the test pressure.

Before testing, a test site should be cleared for safety, while bringing the piping system up to a target test pressure. The area around the test assembly, to a minimum distance defined as an exclusion zone shall be cordoned off such that unauthorized personnel are steered away from the exclusion joint prior to commencement of the pneumatic testing.

Pneumatic tests are potentially more dangerous than other stress tests, such as hydrostatic tests, because of the higher level of potential energy stored during gas compression. The amount of stored energy inside the system can be calculated and expressed as an equivalent number of pounds of TNT. Care must be exercised to minimize the chance of brittle failure during testing by initially assuring the system is suitable for pneumatic testing. Pneumatic testing needs supervision and guidance of senior experienced staff. When performing pneumatic testing of a piping system, they should be tested each segment at a time.

A need exists for a system that can control the introduction of pneumatic pressure to a piping system under test from a location outside of an exclusion zone. The present disclosure meets this need.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure provides a novel remote pneumatic testing system for piping systems. The pneumatic testing system disclosed herein facilitates remote testing to enhance the safety of personnel involved in the testing process. Advantageously, the pneumatic testing system disclosed herein may utilize blockchain, Internet of Things, and artificial intelligence in various manners.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
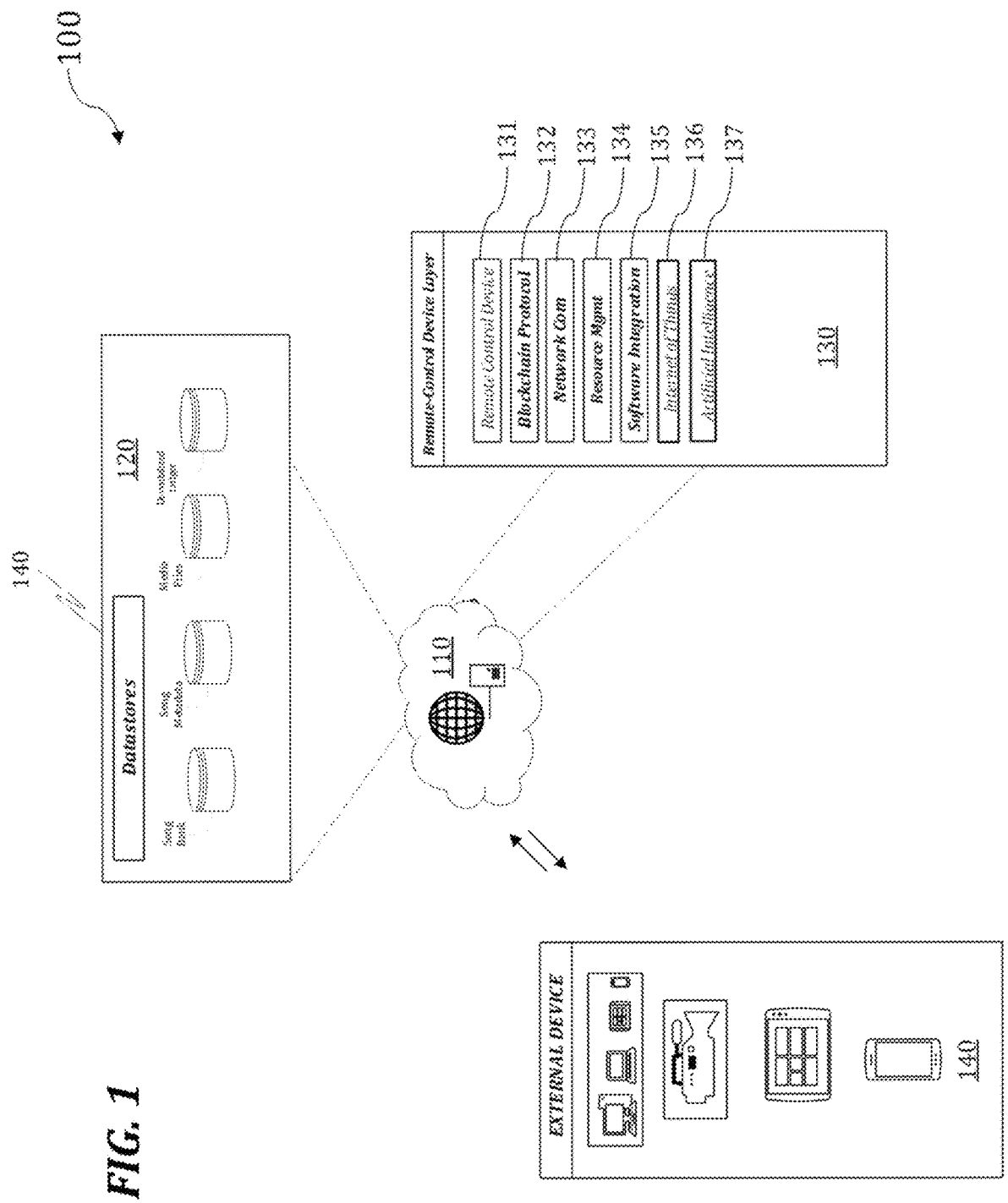
FIG. 1 illustrates a block diagram of an operating environment in accordance with one embodiment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of remote pneumatic testing.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

A remote pneumatic testing platform 100 provides a manner to perform pneumatic testing on a piping system remotely. In one or more implementations, platform 100 can be employed perform pneumatic testing remotely.

Embodiments of the present disclosure may comprise methods, systems, and a computer readable medium comprising, but not limited to, at least one of the following:
A. A UI Layer;
B. A Relay Layer;
C. An API Layer;
D. A Protocol Layer;

In some embodiments, the present disclosure may provide an additional set of modules for further facilitating the software and hardware platform. The additional set of modules may comprise, but not be limited to:
E. An Oracle Layer.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

Network Layer

According to various embodiments, the remote pneumatic testing platform 100 may include a network layer 110. The network layer may include hardware and/or software that is configured to allow for communication among various components of the platform 100. For example, the network layer 110 may include one or more server computers, one or more network switches, one or more routers. The network layer 110 may enable wireless and/or wired communication among the various devices that make up the platform 100. As examples, the network layer may facilitate communications using wired standards under Institute of Electrical and Electronics Engineers (IEEE) 802.3 standards, wireless communication via Wi-Fi using IEEE 802.11 standards, wireless communication over a personal area network using IEEE 802.15 standards (e.g., Bluetooth, ZigBee, etc.), wireless communication using cellular data communication, and/or wireless communication using radio frequency communication.

Datastore Layer

According to various embodiments, a datastore layer 120 may be formed from hardware and/or software that is configured to store data in various formats. For example, the datastore layer 120 may include local or remote storage for media files, a media bank, metadata, decentralized ledgers or blockchains, a storage area network (SAN), a network attached storage (NAS) and/or other data storage. Data may be written to or read from the datastore layer 120 via physical access and/or through connection with the network layer.

Remote-Control Device Layer

A Remote-Control Device Layer 130 may be formed from hardware and/or software that is configured to compile commands from a user (e.g., administrator of a pneumatic test) into machine readable codes and vice versa. The Remote-Control Device Layer 130 can send commands to external devices such as, but not limited to, piping system components (e.g., control valves, gauges, etc.), pressure system components, alert systems, geofence systems, etc.

External Device Layer

According to various embodiments, one or more external hardware and/or software devices may be included in an external device layer 140, either by being either connected to a local machine or through the network layer 110, in the operating environment. Such external devices may include, by way of non-limiting example, a controllable solenoid valve, components within a piping system, tablets, smartphones, laptops, cameras, horns etc. In some embodiments, the external device layer may also include:

UI Layer

A UI Layer may be employed by the external device layer 140 as an interface through which the user of a user device can interact with the remote pneumatic testing platform 100. For example, the UI Layer may allow a user of a user device to send data to and/or receive data from the datastore layer 120 and/or provide one or more commands to the remote control layer 130. The UI layer may be part of a personal device such as a smart phone or a personal computing device such as a desktop computer or a laptop. In some embodiments the UI Layer may take the form of a website or application displayed by the user device.

API Layer

An API Layer may be employed by the external device layer 140 to compile a user's commands into machine readable codes and to translate machine-readable code into a human readable output to present to a user. The API layer can be an application running on a web browser, or a stand-alone application running on user's device.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 700 may be employed in the performance of some or all of the stages disclosed with regard to the methods. Similarly, an apparatus may be employed in the performance of some or all of the stages of the methods. As such, the apparatus may comprise at least those architectural components as found in computing device 700.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Although the aforementioned method has been described to be performed by the platform 700, it should be understood that computing device 700 may be used to perform the various stages of the method. Furthermore, in some embodiments, different operations may be performed by different networked elements in operative communication with computing device 700. For example, a plurality of computing devices may be employed in the performance of some or all of the stages in the aforementioned method. Moreover, a plurality of computing devices may be configured much like a single computing device 700. Similarly, an apparatus may be employed in the performance of some or all stages in the method. The apparatus may also be configured much like computing device 700.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a remote pneumatic testing platform consistent with embodiments of the present disclosure may be provided. By way of non-limiting example, a remote pneumatic testing platform 100 for providing the methods and systems for may be hosted in both a blockchain protocol ("on-chain") and off of a blockchain protocol ("off-chain"). One possible embodiment of the remote pneumatic testing platform 100 may be provided by the Ethereum protocol (or similar protocol) provided by ethereum.org. It should be understood by one having ordinary skill in the art that layers and stages performed by the layers may be either "on-chain" or "off-chain." The present disclosure anticipates embodiments with variations as to which stages may be performed "on-chain" or "off-chain." It should also be understood by one having ordinary skill in the art that "on-chain" or "off-chain" layers or stages may be implemented as protocols for doing a particular, well-defined, circumscribed function.

Accordingly, embodiments of the present disclosure provide a software and hardware platform comprised of a distributed set of computing elements, including, but not limited to:

A. Remote-Control Device Module

According to various embodiments, the remote pneumatic testing platform 100 may include a remote-control device module 131. As shown in FIG. 1, the remote control device module 131 may be a module disposed (physically and/or logically) within the remote control device layer 130). Alternatively, the remote control device module 131 may be disposed at another location within the remote pneumatic testing platform 100. The remote-control device module 131 may include sub-modules for transmitting instructions to a remote piping system and for retrieving information from the piping system. For example, the remote-control device module 131 may transmit instructions for initiating a pneumatic test of a piping system. As a further example, the remote control device module 131 may retrieve pressure data from a pressure gauge and/or stress/strain data from a piping system.

B. Blockchain Protocol Module

According to various embodiments, the remote pneumatic testing platform 100 may include a blockchain protocol module 132. As shown in FIG. 1, the blockchain protocol module 132 may be a module disposed (physically and/or logically) within the remote control device layer 130). Alternatively, the blockchain protocol module 132 may be disposed at another location within the remote pneumatic testing platform 100. In some embodiments, manual checks (e.g., leak checks) performed during the pneumatic testing process may be verified or confirmed with the remote-control device module 131 and then sent to a blockchain framework. Positive confirmation of safety checks, test fill rate optimization, and/or catastrophic failure prediction models may be implemented by the remote-control device module 131, which may be partially or entirely, implemented within a blockchain framework. In various embodiments, the blockchain protocol module 132 can facilitate the process of writing data to a sequence of blocks in a blockchain framework. For example, the blockchain protocol module 132 may write data to a sequence of blocks using an Ethereum protocol. For the Ethereum protocol, or similar blockchain protocols, block sizes are not limited and are therefore capable of storing data sets associated with the pneumatic testing process. Alternatively, the blockchain protocol may specify a limited block size. In such cases, the specified block size may be large enough to store the data sets associated with the pneumatic testing process. In some embodiments, a peer-to-peer file system may be implemented within an Ethereum blockchain framework to facilitate file storage.

An Ethereum protocol, or other similar blockchain protocol, can facilitate decentralized transactions in a Turing-complete execution environment. Thus, the blockchain protocol may be used to perform any computation, such as an algorithm. Smart contracts can be used to execute the computations and, for each transaction, a computation is executed within the Ethereum protocol.

In various embodiments, the blockchain protocol may use smart contracts to store data and/or cause operations to occur. In embodiments, each smart contract may hold any arbitrary state and can perform any arbitrary computation. Advantageously, smart contracts can call or otherwise trigger other smart contracts, and/or can hold data.

C. Network Communication Module

According to some embodiments, a network communication module 133 may enable or facilitate connection of the remote pneumatic testing platform 100 to devices in networked communication with the platform. In some embodiments, the network communication module 133 may enable or facilitate communication amount various devices in the remote pneumatic testing platform 100. The network communication module 133 may facilitate the remote pneumatic testing platform 100 monitoring networked devices such as computing systems, cloud environments, or datastores. As shown in FIG. 1, the network communication module 133 may be a module disposed (physically and/or logically) within the remote control device layer 130). Alternatively, the network communication module 133 may be disposed at another location within the remote pneumatic testing platform 100.

D. Resource Management Module

According to various embodiments, the remote pneumatic testing platform 100 may be hosted on a distributed network of computing devices. The distributed network of computing devices may be managed by a resource management module 134. As shown in FIG. 1, the resource management module 134 may be a module disposed (physically and/or logically) within the remote control device layer 130). Alternatively, the resource management module 134 may be disposed at another location within the remote pneumatic testing platform 100. The resource management module 134 may include hardware and/or software configured to manage the resources of the distributed network of computing devices. For example, the resource management module 134 may calculate or otherwise analyze resource use, such as the percentage of CPU or RAM being used, for one or more (e.g., each) device, of the distributed network of computing devices. In embodiments, the resource management module 134 may distribute tasks across the network of devices based on the analysis (e.g., to improve or help to optimize one or more aspects of a performance of one or more devices in the distributed network of devices). Different users may require different resource consumption at different times or may have differing resource availability on their devices. By managing the resources used, multiple users may "share" computing resources to improve performance. Additionally, computing devices not associated with a particular user may be in a networked connected to the platform 100. Computing resources on such a device may also be accessible by users of the platform 100 to improve performance.

E. Software Integration Module

According to various embodiments, the remote pneumatic testing platform 100 may include a software integration module 135. As shown in FIG. 1, the software integration module 135 may be a module disposed (physically and/or logically) within the remote control device layer 130). Alternatively, the software integration module 135 may be disposed at another location within the remote pneumatic testing platform 100. In embodiments, the software integration module 135 may include protocols for allowing operative networked communication between the remote pneumatic testing platform 100 and various software platforms, such as, but not limited to, alert software, geofence software, machine learning, and artificial intelligence software. The software integration module 135 may enable the remote pneumatic testing platform 100 to be used as a "plug-in" or otherwise incorporated into or operable with diverse software.

F. Internet of Things Module

According to various embodiments, the remote pneumatic testing platform 100 includes an internet of things module 136. As shown in FIG. 1, the internet of things module 136 may be a module disposed (physically and/or logically) within the remote control device layer 130). Alternatively, the internet of things module 136 may be disposed at another location within the remote pneumatic testing platform 100. In some embodiments, the internet of things module 136 may extend Internet connectivity from computers and related devices to other network-connected physical devices or common objects. The internet of things module 136 may leverage technologies such as embedded systems, wireless sensors, and automation to communicate with the network-connected devices. The Internet of Things module 136 may be communicatively coupled to, for example, a pressure source (e.g., gas cylinder), one or more components of a piping system (e.g., one or more control valves), one or more alert system components at a testing site, and/or one or more sensors disposed on or proximate to the piping system. In some embodiments, the Internet of Things module 136 may be a distributed system. The internet of Things module 136 may collect data, such as (but not limited to) environmental data at a pneumatic test site (e.g., a piping system under test). For example, the Internet of Things module 136 may collect flow, pressure, stress/strain, vibration, and/or temperature data.

G. Artificial Intelligence Module

In some embodiments, the remote pneumatic testing platform 100 may include an artificial intelligence module 137. As shown in FIG. 1, the artificial intelligence module 137 may be a module disposed (physically and/or logically) within the remote control device layer 130). Alternatively, the artificial intelligence module 137 may be disposed at another location within the remote pneumatic testing platform 100. The artificial intelligence module 137 may include a computer system that is able to perform tasks that ordinarily require human intelligence. Many artificial intelligence systems are powered by machine learning whereas some are powered by deep learning and others by rules. A subset of artificial intelligence is machine learning, which refers to the concept that computer programs can automatically learn from and adapt to new data without being assisted by humans. Deep learning techniques enable this automatic learning through the absorption of huge amounts of unstructured data such as text, images, or video.

The artificial intelligence module 137 may determine, for example, test fill rate optimization of pressure sources in addition to catastrophic failure prediction models. The artificial intelligence module may receive or exchange data with the one or more of the network connected devices associated with the internet of things module 136.

The artificial intelligence module 137 may use machine learning and/or artificial intelligence processing techniques. For example, the machine learning or artificial intelligence techniques may be used to determine a test fill rate for a piping system. As another example, the machine learning or artificial intelligence techniques may be used to help predict failure conditions of a piping system. In an embodiment, the machine learning processing may include use of a machine learning engine. Machine learning includes various techniques in the field of artificial intelligence that deal with computer-implemented, user-independent processes for solving problems that have variable inputs.

In some embodiments, the machine learning engine trains a machine learning model to perform one or more operations. Training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). For example, the machine learning model may be used in determining an optimal fill rate for a piping system.

In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

In an embodiment, a machine learning engine may use many different techniques to label, classify, and/or categorize inputs. A machine learning engine may transform inputs (e.g., data from one or more sensors and/or gauges included in the piping system) into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The machine learning model and techniques are discussed for example purposes only and should not be construed as limiting one or more embodiments.

In an embodiment, as a machine learning engine applies different inputs to a machine learning model, the corresponding outputs are not always accurate. As an example, the machine learning engine may use supervised learning to train a machine learning model. After training the machine learning model, if a subsequent input is identical to an input that was included in labeled training data and the output is identical to the supervisory signal in the training data, then output is certain to be accurate. If an input is different from inputs that were included in labeled training data, then the machine learning engine may generate a corresponding output that is inaccurate or of uncertain accuracy. In addition to producing a particular output for a given input, the machine learning engine may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

Figure 2:
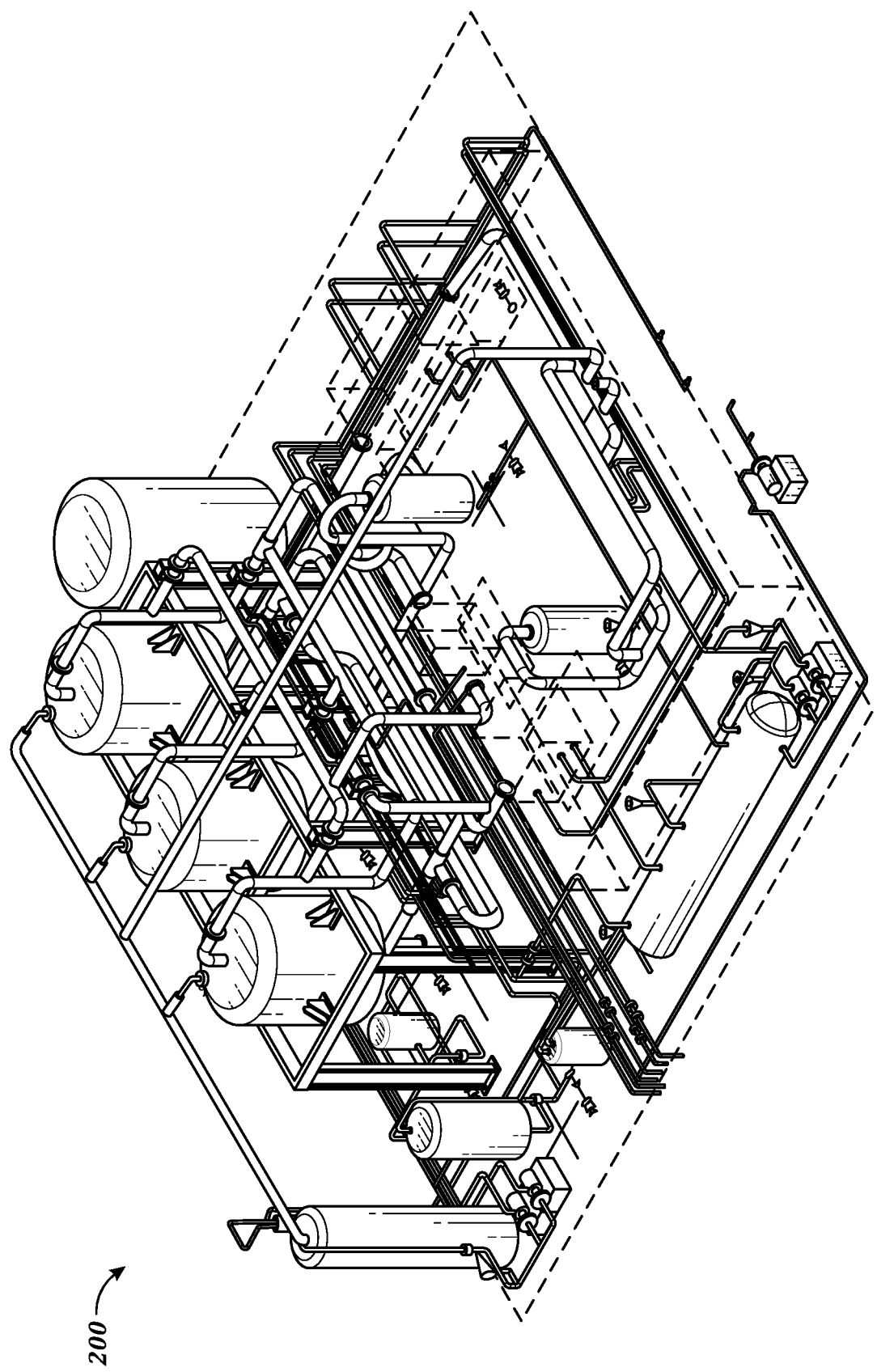
FIG. 2 illustrates a piping system in accordance with one embodiment consistent with the present disclosure.

In embodiments, the remote pneumatic test platform may be used with a piping system to remotely test the piping system for leaks and/or other faults. FIG. 2 illustrates a piping system 200 in accordance with one embodiment consistent with the present disclosure. The design of the piping system 200 is established by the functional requirements of piping a fluid (e.g., a liquid or a gas) from one point to another. The design may be influenced by criteria such as properties of the fluid being transported (e.g., viscosity, compressibility, corrosiveness, temperature, pressure, etc.), an allowable pressure drop or energy loss, a desired velocity or flow rate of the fluid, space limitations, process requirements like free drain or requirement of straight run, stress analysis, etc. Accordingly, design and construction of the piping system 200 may be a significant engineering effort. In some cases, special fittings and/or support structures (e.g., structural T or inverted L, cantilevers, U portals, pedestals, etc.) must be built solely for the purpose of supporting a piping system 200.

The piping system 200 may include one or more pipes, one or more fittings, and/or one or more valves. Industrial process piping (and accompanying in-line components) may be manufactured from various materials, such as wood, fiberglass, glass, metal (e.g., steel, aluminum, copper, etc.), plastic, and/or concrete. While a particular piping configuration is shown in FIG. 2, it should be understood that the piping design may be arbitrarily complex. Accordingly, testing the piping system 200 for leaks may be a very complex operation.

Figure 3:
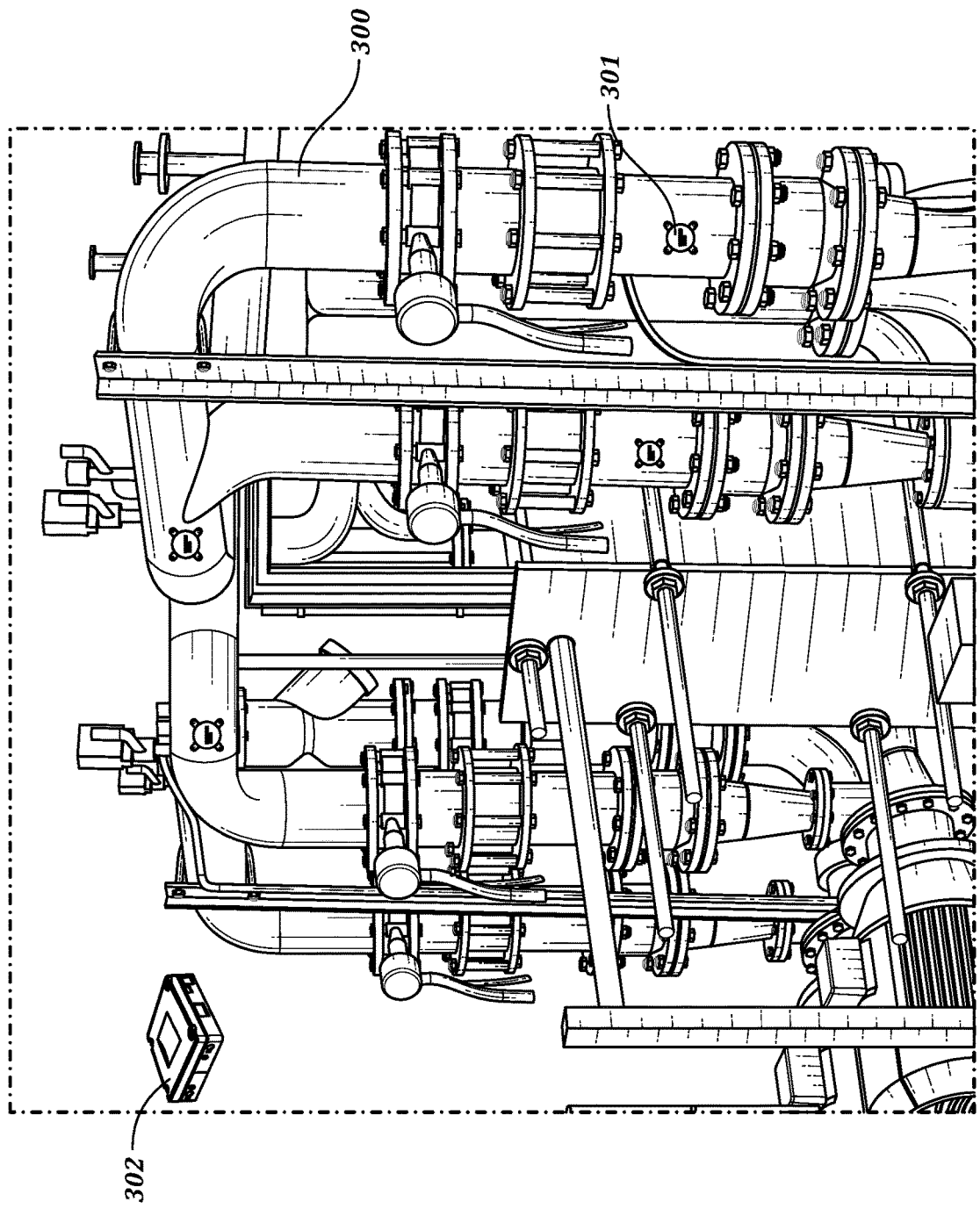
FIG. 3 illustrates example pipes of a piping system in accordance with one embodiment consistent with the present disclosure.

FIG. 3 illustrates an example pipe 300 forming a portion of a piping system (e.g., piping system 200) in accordance with one embodiment consistent with the present disclosure. As discussed above, the pipe 300 (and any accompanying in-line components, such as fittings and/or valves) may be formed from wood, fiberglass, glass, metal (e.g., steel, aluminum, copper, etc.), plastic, and/or concrete. The pipe 300 may be used to carry fluids (e.g., liquids, gases), slurries, or fine particles. The materials used to form pipe 300 may be selected to suit the operating conditions of the piping system, including the material being carried by the pipe, the environmental conditions in which the pipe is disposed, and/or existing piping and construction codes.

In embodiments, the piping system may include one or more Internet of Things (IoT) sensors 301. The IoT sensors 301 may be disposed on or proximate to one or more pipes 300 of the piping system. In embodiments, the IoT sensors 301 may be used to communicate collected sensor data. For example, each collect by connecting to an IoT gateway 302 or other edge device where data is either sent to a cloud to be analyzed or otherwise analyzed on a local machine. In some embodiments, the IoT sensors 301 may communicate with each other and/or a centralized data repository. In some embodiments, the IoT sensors 301 may receive information from the other IoT sensors and/or the centralized data repository. Each IoT sensor 301 may perform one or more actions based at least in part on the received information.

In some embodiments, one or more (e.g., each) sensor 301 may be constructed to withstand the environmental conditions of the piping system on which the sensor is disposed. For example, the sensor may be configured to withstand conditions including extreme temperature (e.g., extreme hot, extreme cold), mechanical shock (e.g., vibration), and/or presence of liquid in the operating environment. In some embodiments, one or more (e.g., each) of the IoT sensors 301 may have a relatively small size. This may allow for easier deployment of the sensors 301 in an array of locations disposed along the piping system. In some embodiments, each of the sensors 301 may be similarly sized. Alternatively, the sensors 301 may be of varying sizes. In some embodiments, one or more (e.g., each) of the sensors 301 may be self-identifying and/or self-validating. For example, the sensor may include a unique identifier associated with the sensor. The sensor may include the identifier in each communication transmitted from the sensor. As another example, the sensor may be configured to complete a validating handshake process before initiating communication with another device. In some embodiments, one or more (e.g., each) sensor 301 may be self-calibrating. In some embodiments, one or more—e.g., each) sensor 301 may be self-diagnostic, capable of determining hardware and/or software errors present in the sensor 301. In some embodiments, the sensor 301 may be configured to correct one or more of the hardware and/or software errors identified during the self-diagnostic process.

In some embodiments, the one or more sensors 301 may comprise a plurality of sensors. In particular, there may be a large number (e.g., on the order of tens, dozens, hundreds, etc.) of sensors disposed throughout the piping system. In some embodiments, the plurality of sensors 301 may be configured to form a mesh network, facilitating wireless communication among the plurality of sensors.

One or more (e.g., each) IoT sensor 301 may transmit information to a device for analysis. In some embodiments, the device may comprise one or more IoT sensors. Alternatively or additionally, the device may comprise a computing device configured to analyze the sensor data. The analysis may include, for example, combining data from multiple sensors. The combined data may be correlated to infer conclusions about latent problems in the piping system. For example, temperature sensors, pressure sensors, stress/strain sensors, and leak sensor data can be used to detect the onset of mechanical failure. In some embodiments, IoT sensor 301 routes the collected data to the cloud for processing and storage and/or to a blockchain framework.

Figure 4:
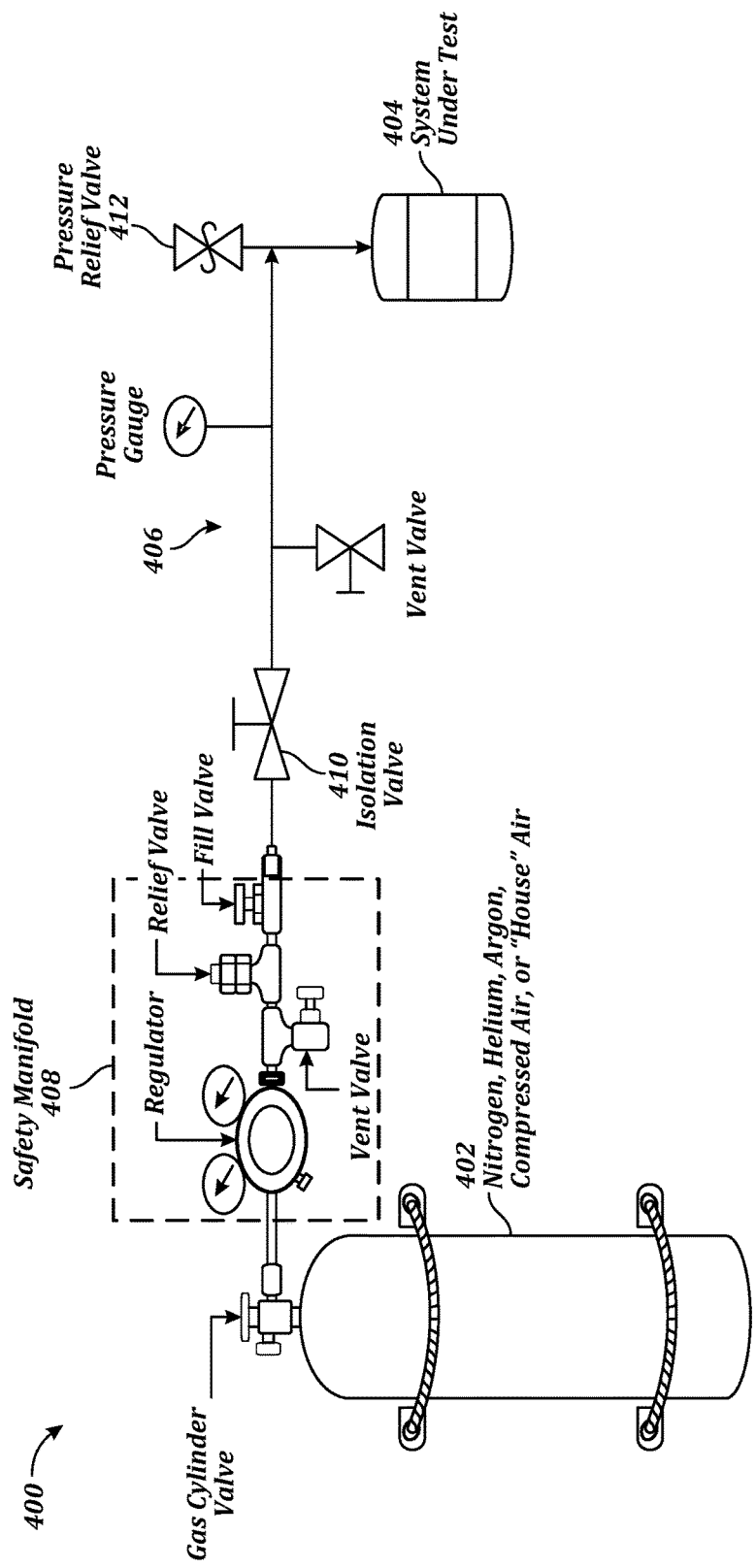
FIG. 4 illustrates an example piping schematic for pneumatic testing in accordance with one embodiment consistent with the present disclosure.

FIG. 4 illustrates an example piping system 400 for pneumatic testing in accordance with embodiments consistent with the present disclosure. As shown in FIG. 4, the piping system 400 includes a fluid source 402, a system under test 404, and connecting piping 406 for facilitating fluid communication between the fluid source and the system under test. In some embodiments, the fluid source 402 comprises a reservoir, such as a tank that may filled with a fluid, such as an inert gas (e.g., nitrogen, a noble gas, etc.) stored under pressure, or compressed air. Alternatively or additionally, the fluid source 402 may include a compressor configured to compress air and inject the compressed air into the piping system 400. While the fluid source 402 shown in FIG. 4 contains a gas, it should be noted that fluid sources containing a liquid (e.g., hydraulic fluid, oil, water, etc.) are also contemplated. The fluid source 402 may be mechanically coupled to the connecting piping 406. In embodiments, the fluid source 402 may be configured to apply pressure during the pneumatic test. The applied pressure is typically in a range of 100-500 psi, though greater pressures (e.g., up to 5,000 psi) are also possible. Those of skill in the art will recognize that a wide variety of pressures may be applied during pneumatic testing.

The connecting piping 406 may include one or more pipes, one or more regulators, one or more valves, one or more transmitters, and/or one or more gauges. As shown in FIG. 4, the connecting piping 406 includes a safety manifold 408 disposed downstream from the fluid source 402. In embodiments, the safety manifold 408 may be configured to regulate a pressure of the fluid in the connecting piping 406. The safety manifold 408 may include, for example, a pressure gauge configured to monitor a fluid pressure within the piping 406 at the safety manifold and one or more valves that may regulate the pressure of the fluid in the piping. For example, the valves of the safety manifold may be adjusted automatically based on the measured pressure at the pressure gauge.

Downstream of the safety manifold is a solenoid valve 410. The solenoid valve 410 may be configured to selectively isolate the fluid source 402 from the remainder of the connecting piping 406 and the system under test 404. In some embodiments, the solenoid valve 410 may be an electromechanically operated valve. It should be understood by those having ordinary skill in the art that solenoid valves may differ in the characteristics of the electric current they use, the strength of the magnetic field they generate, the mechanism they use to regulate the fluid, and/or the type and characteristics of fluid they control. In some embodiments, the solenoid valve 410 may be remotely controlled, such that the pneumatic testing can be affected without a human being within the testing site. As a particular example, the solenoid valve may be in controlled via a remote-control device layer (e.g., the remote-control device layer 130).

In some embodiments, the connecting piping 406 may include one or more pressure gauges and/or vent valves disposed downstream of the solenoid valve 410. The additional gauges may act as data gathering devices for determining if the pressure in the piping system ais rising as expected during pneumatic testing of the system under test 404. For example, as shown in FIG. 4, the system under test 404 may be mechanically coupled to the connecting piping 406 by a pressure relief valve 412. In some embodiments, the pressure relief valve 412 may allow fluid to escape from the piping system in response to a fluid pressure within the connecting piping 406 at the valve exceeding a particular threshold value. For example, the pressure relief valve may be in communication with one or more pressure gauges to determine a pressure within the connecting piping 406. The pressure relief valve 412 may be remotely controlled via a remote-control device layer (e.g., the remote-control device layer 130), such that the pneumatic testing may be performed without a human on site at the location of the system under test 404. In embodiments, the pressure relief valve 412 may be selected based, at least in part, on the desired pressure to be tested within the system under test 404.

The system under test 404 may include a piping system that is subject to the pneumatic testing. While the system under test 404 is not shown in detail in FIG. 4, those of skill in the art will appreciate that the system under test 404 may include, for example, one or more pipes, one or more in-line components (e.g., fittings), one or more valves, and/or one or more other devices (e.g., a gauge or other sensor configured to measure a pressure, flow rate, and/or temperature of the fluid transmitted by the system under test). As described previously, the components of the system under test 404 may be manufactured from a variety of materials, including wood, fiberglass, glass, steel, aluminum, plastic, copper, and/or concrete.

Figure 5:
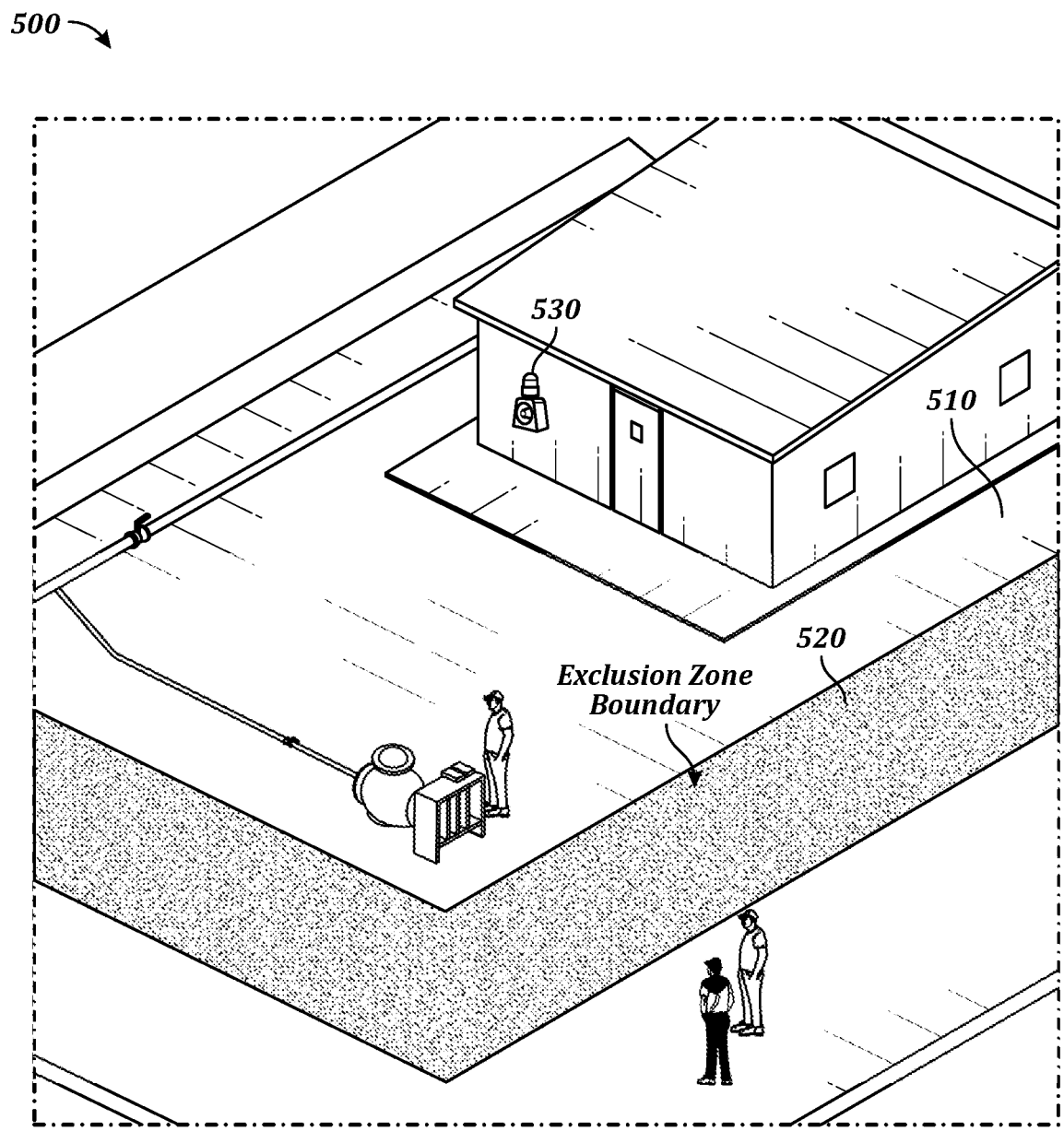
FIG. 5 illustrates an exclusion zone at an example construction site in accordance with one embodiment consistent with the present disclosure.

During pneumatic testing, the system under test 404 may become highly pressurized. Moreover, the system under test 404 is being tested to ensure that the components of the system do not fail at the high pressure. Accordingly, it is unknown whether one or more components may fail. Accordingly, because there may be some risk of catastrophic failure of one or more components of the system under test 404, it may be beneficial to isolate the system under test, such that no humans (or no humans other than a test specialist administering the pneumatic test) are located in the vicinity of the system under text during the testing process. (e.g., within a predetermined distance of the system under test) FIG. 5 illustrates an example site 500, including a system under test (e.g., the system under test 404). The site 500 may include an exclusion zone 510 configured to isolate at least a portion of the site such that humans do not enter the vicinity.

In some embodiments, the exclusion zone 510 may be established by creating a geofence 520 that surrounds the exclusion zone 510. The geofence 520 may be established, for example, via a software application or other software and/or hardware means which employ devices (e.g., GPS, RFID, motion sensors, and/or cameras) to detect an individual or other object crossing a virtual boundary set up around a geographical location at which the system under test is disposed (e.g., entering or exiting the exclusion zone).

In embodiments, the geofence 520 may be configured to perform one or more actions responsive to determining that the boundary has been crossed. For example, in some embodiments, a determination that the geofence 520 has been crossed (e.g., by a person or object entering the exclusion zone 510), may cause activation of an alarm (e.g., an audio and/or visual alert), playback of a recorded message via a speaker, and/or the like. In some embodiments, the geofence 520 may include one or more communication devices for communicating (e.g., using wired and/or wireless communication protocols, including Wi-Fi communication devices, cellular communication devices, radio frequency communication devices, wired and/or wireless gateway devices, and/or the like) with various devices among a pneumatic testing platform. A determination that the geofence 520 has been crossed (e.g., by a person or object entering the exclusion zone 510), may cause the geofence to transmit one or more messages via at least one of the included communication devices. For example, the geofence 520 may transmit a push notification, an SMS and/or MMS message alert, an emergency message, and/or the like. to a person (e.g., a supervisor or testing specialist overseeing the pneumatic testing) to indicate that a person has entered or exited the exclusion zone 510.

As discussed above, a system configured to create the exclusion zone 510 (e.g., by establishing the geofence 520) may be communicatively connected to one or more third-party systems and/or one or more external devices (e.g., sensors, cameras, etc.). The system used to create the exclusion zone 510 and/or perform operations (e.g., controlling a solenoid valve of a pressure source) may include one or more computing devices (e.g., a personal computer, a laptop, a tablet, and/or a smartphone). As a particular example, the system configured to create the geofence may be triggered (e.g., due to the unauthorized entry of the geofence 520 into the exclusion zone 510). Responsive to the trigger, the system may activate a device 530 (e.g., a horn, a loudspeaker, and/or another alert device), that is communicatively coupled to the system to inform those who are facilitating the pneumatic testing and/or those who have crossed the geofence of the unauthorized entry. As a particular example, the device 530 may broadcast a pre-programmed audible message. For example, when the system is tripped, the device 530 may emit a message to "leave the construction site, pneumatic testing is underway." In some embodiments, the system which controls the geofence 520 to create the exclusion zone 510 may control a solenoid valve or other device of a piping system (e.g., the solenoid valve 410) to facilitate pneumatic testing externally to the testing site. In some embodiments, responsive to the system determining that the geofence 520 has been breached (e.g., by a person entering the exclusion zone 510), the system may cause the solenoid valve to close, halting the pneumatic testing.

III. Platform Operation

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 700 may be employed in the performance of some or all of the stages disclosed with regard to the methods. Similarly, an apparatus may be employed in the performance of some or all of the stages of the methods. As such, the apparatus may comprise at least those architectural components as found in computing device 700.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 6:
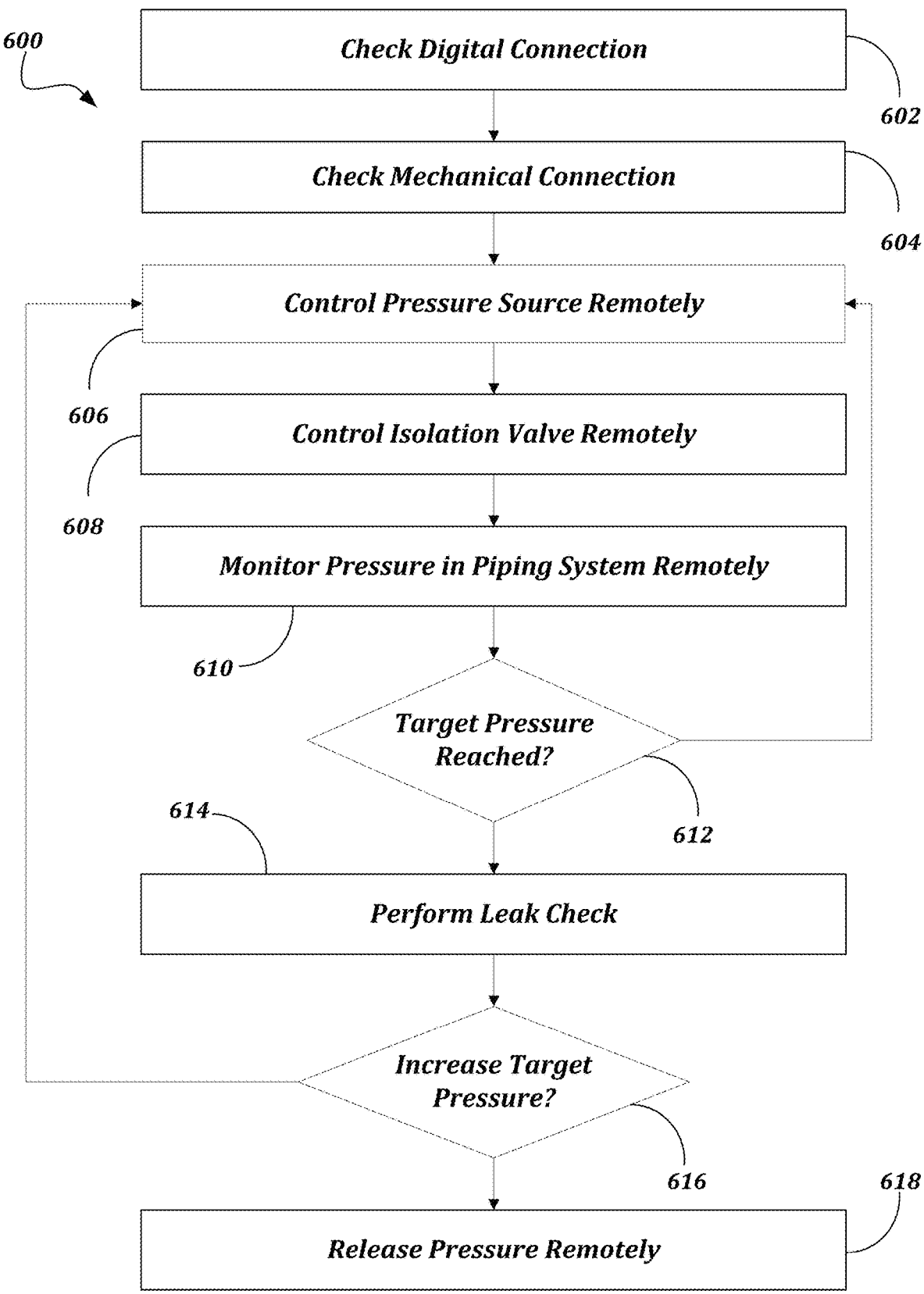
FIG. 6 illustrates a flow chart for a method of performing pneumatic testing in accordance with one embodiment consistent with the present disclosure.

FIG. 6 illustrates a flow chart showing a method 600 for performing remote pneumatic testing in accordance with one embodiment consistent with the present disclosure. The method 600 may begin at step 602 where, prior to starting a remote pneumatic test, one or more pre-test safety procedures may be performed. In some embodiments, the pre-test safety procedures may include, for example, informing one or more (e.g., all) workers present at a site that a pneumatic pressure test of the piping is to occur. The pre-test safety procedures may include a review of the specified pneumatic test. For example, a test technician may review test specification documentation that describes one or more features of the pneumatic test and/or the system to be tested, including a test medium pressure needs, pipe material and joining method, exclusion zone boundaries, and/or the like. As a particular example, the test specification for a piping system may indicate that the test pressure for the system should be 200 psi. The test specification may further specify that, to reach 200 psi, the system should pressurize to 125 psi, 150 psi, 175 psi, and finally 200 psi. In some embodiments the test technician may perform one or more calculations based on the information in the test specification.

The pre-test safety procedure may include a safety walk to check the test site. For example, a test site (e.g., construction site) and/or the system under test may be inspected. The inspection may include, but is not limited to, inspecting a test medium (e.g., pipes) determining the pressure targets, setting up an exclusion zone, and performing a walk-through of the test area. As another example, the pre-test safety procedure may include establishing an exclusion zone at a site that includes the piping system. In embodiment, establishing the exclusion zone may include determining a geography for pneumatic testing and creating an exclusion zone around the geography for pneumatic testing. The system may monitor the exclusion zone for a breach (e.g., a human crossing a boundary into the geography of the exclusion zone). Responsive to a breach, the system may issue an alert based upon the breach. In some embodiments, the system may modify the pneumatic testing if the breach is sustained for a pre-determined time period. In embodiments, the pre-test safety check may include determining that the only people present in the exclusion zone (e.g., as defined in the test specification) are those performing the pneumatic test.

The method 600 begins at stage 604, where the system may check a connection to one or more sensors disposed on a piping system. In embodiments, the connection may be a digital or other electronic connection. In some embodiments, the connection may include a connection between a remote control system and the piping system. For example, a remote control system may be communicatively coupled to one or more devices disposed along a piping system. As particular example, the remote control system may be connected to one or more of a pressure source, a solenoid valve or other isolation valve, a pressure gauge, and/or other components and sub-systems of a piping system to facilitate remote control of the connected devices. The system may facilitate the pneumatic testing without the need for a person to be located directly next to a piping system and/or at the test site. For example, the testing may be administered from a distance of 100-300 feet away from the testing site, to provide improved safety for those administering the test. In some embodiments, the distance from the testing site may be greater, if such distance is necessary and/or desired.

In some embodiments, checking the connection may include a first set of data associated with the checking being retrieved by the system or otherwise received at the system. In some embodiments, responsive to the first set of data confirming the connection being received at the system, the first set of data may be sent to a blockchain framework (e.g., the Ethereum blockchain framework), such that a state of a first smart contract is changed. Further, responsive to the change in the state of the first smart contract, a second contract may be triggered which sends a first permission to proceed with a remote pneumatic testing procedure.

From step 604, the method 600 may proceed to step 606, where the system may check and/or verify a mechanical connection among the pneumatic testing components. For example, the pressure source is mechanically coupled to the system under test. In some embodiments, checking the mechanical connection may be accomplished manually. For example, a worker or test technician at the testing site may verify the mechanical connections. In other embodiments, checking the mechanical connection may be achieved remotely. For example, pressure gauges and other devices can be monitored for properties that indicate that a mechanical connection is made.

In some embodiments, checking the mechanical connection may include a second set of data associated with the checking being retrieved by the system or otherwise received at the system. Responsive to the system receiving the second set of data, that confirms the mechanical connection, the system may send the second set of data to a blockchain framework (e.g., the Ethereum blockchain framework), such that a state of a second smart contract is changed. Upon the change in the state of the second smart contract, a third contract may be triggered, sending a second permission to proceed with a remote pneumatic testing procedure.

In embodiments, the system may control the pressure in a piping system remotely. In particular, the method 600 may proceed to step 608, where the system may remotely control a pressure source. The pressure source may include a fluid reservoir. For example, the pressure source may be a tank of inert gas (e.g., nitrogen, helium, argon), compressed air, or the like. In some embodiments, controlling the pressure source may include allowing the pressure source to pressurize a piping system connected to the pressure source. The pressure source may be coupled directly to a piping system (e.g., the system under test) to achieve pneumatic testing.

Following remote opening of the pressure source in step 608, the method 600 may proceed to step 610, where the system may control an isolation valve remotely. In embodiments the isolation valve may be a solenoid valve or other electromechanically controlled valve. An amount of stress applied to the system may be determined, at least in part, by an amount of fluid (e.g., the inert gas or compressed air) released into the piping system during the pneumatic test. During a pneumatic test, the isolation valve separating the pressure source from the system under test may be gradually opened to allow the system under test to reach a target pressure. The target pressure may be governed by standards set by the American Society of Mechanical Engineers (ASME) and/or any regulatory agency. For example, the target pressure for a system under test may be 110% of the design target pressure of the pipe or piping system (e.g., 110% of the pressure at which the system is intended to operate). As a particular example, pressure applied during the pneumatic test is typically in a range of 100-500 psi, though greater pressures (e.g., up to 5,000 psi) are also possible. Those of skill in the art will recognize that a wide variety of pressures may be applied during pneumatic testing. In some embodiments, the pneumatic test may comprise a series of tests which increase in pressure intensity until the maximum test pressure is reached. For example, to reach a maximum test pressure of 200 psi, the method may pressurize the system under test to 125 psi, 150 psi, 175 psi, and finally 200 psi.

In some embodiments, throttling techniques may be applied to the isolation valve to control. The throttling techniques may include controlling a solenoid disposed within the isolation valve to adjust a degree to which the isolation valve is open. In some embodiments, the degree to which the isolation valve is opened may be controlled, at least in part, based on a pressure control predictive model. The pressure control predictive model may be used to determine an expected fill rate of a piping system from the pressure source. The pressure control predictive model may be used to help optimize at least one property of the stress and strain applied to the piping system during the pneumatic testing. In some embodiments, the throttling techniques applied to the isolation valve may help to improve throughput of the testing process, reducing the time required for the system under test to reach a desired pressurization. In some embodiments, the pressure control predictive model may help to reduce chances of catastrophic failure of the piping system during the testing process and/or during normal operation.

After the inert gas is injected into the piping system at step 610, the method may proceed to step 612, where the pressure within the piping system is remotely monitored. Monitoring the pressure may include monitoring any of one or more components of the piping system while a target pressure is being reached. As an example, the remote monitoring may be used to help ensure that the actual pressure within the piping system substantially matches a target pressure set forth in the pressure control predictive model.

During the monitoring process, the method may proceed to step 614, where the system may determine whether the target pressure has been reached. In embodiments, determining if the target pressure has been reached may include, for example, comparing one or more pressure readings received during the monitoring step 612 to the target pressure.

If the target pressure is not reached (NO at step 614), the method 600 may return to step 612, monitoring the pressure remotely. In some embodiments, a third set of data associated with pressure applied to a piping system is retrieved when the pressure is remotely monitored. The system may determine that the third set of data does not confirm that the targeted pressure is applied to the piping system. Responsive to such a determination, the system may send a third set of data to the Ethereum blockchain framework where a state of a fifth smart contract is changed. Changing the state of the fifth smart contract may triggers a submission of a fourth permission to the remote pneumatic testing procedure to add more pressure to the piping system.

Alternatively, if the target pressure is reached (YES at step 614), the system may determine that the third set of data that is received confirms that the target pressure is applied to the piping system. Responsive to such a determination, the third set of data may be sent to the Ethereum blockchain framework where a state of a fourth smart contract is changed. Changing the state of the fourth smart contract may trigger a submission of a third permission to the remote pneumatic testing procedure to refrain from increasing pressure to the piping system. In embodiments, once the target pressure is reached, the system may hold the target pressure for a duration of time. As a particular example the system may hold pressure in the system under test for 30 minutes, 60 minutes, two hours, or the like. The duration may be selected to allow for a testing technician to perform an inspection of the system under test.

The method 600 may proceed to block 616, where the system may perform a leak test on the piping system under test. In some embodiments, performing the leak test may include, for example, the system confirming that the target pressure is reached by monitoring the pressure of a pipe or section of a piping system, and that the target pressure is maintained for a pre-determined time period. Additionally or alternatively, performing the leak test may include generating one or more profiles of the piping system under test. The generated profiles may include, for example, one or more thermal profiles, one or more acoustic profiles, and/or any other suitable profile known in the art. The leak test may be performed remotely through monitoring of one or more devices and/or sub-systems in a piping system. Alternatively or additionally, leak testing may be performed manually by authorized personnel present at the test site.

Responsive to a determination that the piping system successfully passes the leak check, the pneumatic test may continue. Alternatively, responsive to a determination that the piping system fails the leak check, the pneumatic test may end.

In some embodiments, responsive to the determination that the piping system passes the leak test, the method 600 may proceed to step 618, where the system determines whether the target pressure is to be increased. In some embodiments, the system remotely determines whether the target pressure is to be increased. A determination that the target pressure is to be increased may be made based, at least in part, according to a test scheme of a pneumatic test plan.

If the target pressure is to be increased (YES in step 618), the method 600 may return to step 608.

Alternatively, if the target pressure is not to be increased (NO in step 618), the method 600 may proceed to stage 620, where the pressure may be released remotely. In some embodiments, the target pressure is not to be increased when, for example, the pneumatic testing is complete. In embodiments, the pressure may be released from the piping system by controlling (e.g., closing) a control valve of the pressure source. In some embodiments, releasing the pressure may include, for example, opening one or more vents connecting the piping system to the pressure source. It should be understood by those having ordinary skill in the art that the releasing pressure from the piping system may involve adhering to a set of standards which may be governed by procedures issued from a regulatory agency.

In some embodiments, the platform 100 may be used to provide catastrophic failure prediction models instead of or in addition to pneumatic testing. Data obtained by sensors and other devices within a piping system may be processed. In some embodiments, processing the data may include routing the data received from the sensors to a cloud service such that machine learning algorithms can be applied thereto. In some embodiments, a local machine learning algorithm may be applied to the received data. As an example, a machine learning algorithm (e.g., a local algorithm and/or an algorithm applied by a cloud device) may receive data including pressure, temperature, stress/strain, vibration, and/or any other data related to the piping system. The machine learning algorithm may process the received data to help predict conditions and/or time frame under which components within a piping system may fail.

Embodiments of the present disclosure provide a hardware and software platform operative as a distributed system of modules and computing elements.

Platform 100 may be embodied as, for example, but not be limited to, a website, a web application, a desktop application, backend application, and a mobile application compatible with a computing device 700. The computing device 700 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service. Although the methods disclosed herein have been sometimes described to be performed by a computing device 700, it should be understood that, in some embodiments, different operations may be performed by a plurality of the computing devices 700 in operative communication at least one network.

Embodiments of the present disclosure may comprise a system having a central processing unit (CPU) 720, a bus 730, a memory unit 740, a power supply unit (PSU) 750, and one or more Input/Output (I/O) units. The CPU 720 coupled to the memory unit 740 and the plurality of I/O units 760 via the bus 730, all of which are powered by the PSU 750. It should be understood that, in some embodiments, each disclosed unit may actually be a plurality of such units for the purposes of redundancy, high availability, and/or performance. The combination of the presently disclosed units is configured to perform the stages any method disclosed herein.

Figure 7:
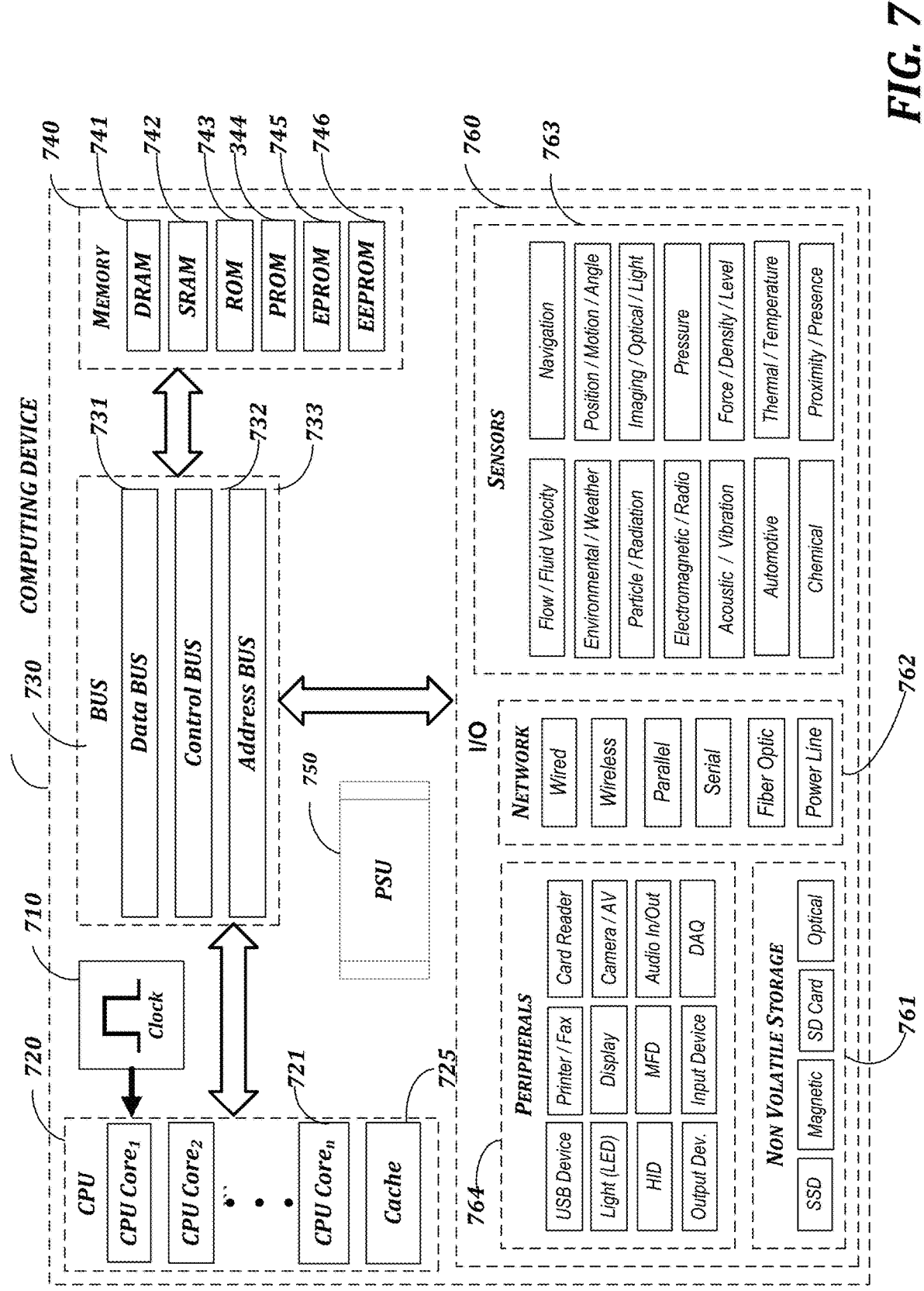
FIG. 7 is a block diagram of a system including a computing device for performing the methods of FIG. 6.

FIG. 7 is a block diagram of a system including computing device 700. Consistent with an embodiment of the disclosure, the aforementioned CPU 720, the bus 730, the memory unit 740, a PSU 750, and the plurality of I/O units 760 may be implemented in a computing device, such as computing device 700 of FIG. 7. Any suitable combination of hardware, software, or firmware may be used to implement the aforementioned units. For example, the CPU 720, the bus 730, and the memory unit 740 may be implemented with computing device 700 or any of other computing devices 700, in combination with computing device 700. The aforementioned system, device, and components are examples and other systems, devices, and components may comprise the aforementioned CPU 720, the bus 730, the memory unit 740, consistent with embodiments of the disclosure.

At least one computing device 700 may be embodied as any of the computing elements illustrated in all of the attached figures, including; A Network Layer, A Remote-Control Device Layer, A Datastore Layer, An External Device Layer, an Account Layer, A Decentralized Exchange Layer, a Remote-Control Device Module, a Blockchain Protocol Module, A Network Communication Module. A computing device 700 does not need to be electronic, nor even have a CPU 720, nor bus 730, nor memory unit 740. The definition of the computing device 700 to a person having ordinary skill in the art is a device that computes, especially a programmable [usually] electronic machine that performs high-speed mathematical or logical operations or that assembles, stores, correlates, or otherwise processes information. Any device which processes information qualifies as a computing device 700, especially if the processing is purposeful.

With reference to FIG. 7, a system consistent with an embodiment of the disclosure may include a computing device, such as computing device 700. In a basic configuration, computing device 700 may include at least one clock module 710, at least one CPU 720, at least one bus 730, and at least one memory unit 740, at least one PSU 750, and at least one I/O 760 module, wherein I/O module may be comprised of, but not limited to a non-volatile storage sub-module 761, a communication sub-module 762, a sensors sub-module 763, and a peripherals sub-module 764.

A system consistent with an embodiment of the disclosure the computing device 700 may include the clock module 710 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 720, the central component of modern computers, which relies on a clock. The only exceptions are asynchronous circuits such as asynchronous CPUs. The clock 710 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 700 use a "clock multiplier" which multiplies a lower frequency external clock to the appropriate clock rate of the CPU 720. This allows the CPU 720 to operate at a much higher frequency than the rest of the computer, which affords performance gains in situations where the CPU 720 does not need to wait on an external factor (like memory 740 or input/output 760). Some embodiments of the clock 710 may include dynamic frequency change, where, the time between clock edges can vary widely from one edge to the next and back again.

A system consistent with an embodiment of the disclosure the computing device 700 may include the CPU unit 720 comprising at least one CPU Core 721. A plurality of CPU cores 721 may comprise identical CPU cores 721, such as, but not limited to, homogeneous multi-core systems. It is also possible for the plurality of CPU cores 721 to comprise different CPU cores 721, such as, but not limited to, heterogeneous multi-core systems, big. little systems and some AMD accelerated processing units (APU). The CPU unit 720 reads and executes program instructions which may be used across many application domains, for example, but not limited to, general purpose computing, embedded computing, network computing, digital signal processing (DSP), and graphics processing (GPU). The CPU unit 720 may run multiple instructions on separate CPU cores 721 at the same time. The CPU unit 720 may be integrated into at least one of a single integrated circuit die and multiple dies in a single chip package. The single integrated circuit die and multiple dies in a single chip package may contain a plurality of other aspects of the computing device 700, for example, but not limited to, the clock 710, the CPU 720, the bus 730, the memory 740, and I/O 760.

The CPU unit 720 may contain cache 722 such as, but not limited to, a level 1 cache, level 2 cache, level 3 cache, or combination thereof. The aforementioned cache 722 may or may not be shared amongst a plurality of CPU cores 721. The cache 722 sharing comprises at least one of message passing and inter-core communication methods may be used for the at least one CPU Core 721 to communicate with the cache 722. The inter-core communication methods may comprise, but not limited to, bus, ring, two-dimensional mesh, and crossbar. The aforementioned CPU unit 720 may employ symmetric multiprocessing (SMP) design.

The plurality of the aforementioned CPU cores 721 may comprise soft microprocessor cores on a single field programmable gate array (FPGA), such as semiconductor intellectual property cores (IP Core). The plurality of CPU cores 721 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 721, for example, but not limited to Instruction-level parallelism (ILP) such as, but not limited to, super-scalar pipelining, and Thread-level parallelism (TLP).

Consistent with the embodiments of the present disclosure, the aforementioned computing device 700 may employ a communication system that transfers data between components inside the aforementioned computing device 700, and/or the plurality of computing devices 700. The aforementioned communication system will be known to a person having ordinary skill in the art as a bus 730. The bus 730 may embody internal and/or external plurality of hardware and software components, for example, but not limited to a wire, optical fiber, communication protocols, and any physical arrangement that provides the same logical function as a parallel electrical bus. The bus 730 may comprise at least one of, but not limited to a parallel bus, wherein the parallel bus carry data words in parallel on multiple wires, and a serial bus, wherein the serial bus carry data in bit-serial form. The bus 730 may embody a plurality of topologies, for example, but not limited to, a multidrop/electrical parallel topology, a daisy chain topology, and a connected by switched hubs, such as USB bus. The bus 730 may comprise a plurality of embodiments, for example, but not limited to:

Internal data bus (data bus) 731/Memory bus
Control bus 732
Address bus 733
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/ Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 700 may employ hardware integrated circuits that store information for immediate use in the computing device 700, know to the person having ordinary skill in the art as primary storage or memory 740. The memory 740 operates at high speed, distinguishing it from the non-volatile storage sub-module 761, which may be referred to as secondary or tertiary storage, which provides slow-to-access information but offers higher capacities at lower cost. The contents contained in memory 740, may be transferred to secondary storage via techniques such as, but not limited to, virtual memory and swap. The memory 740 may be associated with addressable semiconductor memory, such as integrated circuits consisting of silicon-based transistors, used for example as primary storage but also other purposes in the computing device 700. The memory 740 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 741, Static Random-Access Memory (SRAM) 742, CPU Cache memory 725, Advanced Random-Access Memory (A-RAM), and other types of primary storage such as Random-Access Memory (RAM).

Non-volatile memory which can retain stored information even after power is removed, for example, but not limited to, Read-Only Memory (ROM) 743, Programmable ROM (PROM) 744, Erasable PROM (EPROM) 745, Electrically Erasable PROM (EEPROM) 746 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 700 may employ the communication system between an information processing system, such as the computing device 700, and the outside world, for example, but not limited to, human, environment, and another computing device 700. The aforementioned communication system will be known to a person having ordinary skill in the art as I/O 760. The I/O module 760 regulates a plurality of inputs and outputs with regard to the computing device 700, wherein the inputs are a plurality of signals and data received by the computing device 700, and the outputs are the plurality of signals and data sent from the computing device 700. The I/O module 760 interfaces a plurality of hardware, such as, but not limited to, non-volatile storage 761, communication devices 762, sensors 763, and peripherals 764. The plurality of hardware is used by the at least one of, but not limited to, human, environment, and another computing device 700 to communicate with the present computing device 700. The I/O module 760 may comprise a plurality of forms, for example, but not limited to channel I/O, port mapped I/O, asynchronous I/O, and Direct Memory Access (DMA).

Consistent with the embodiments of the present disclosure, the aforementioned computing device 700 may employ the non-volatile storage sub-module 761, which may be referred to by a person having ordinary skill in the art as one of secondary storage, external memory, tertiary storage, off-line storage, and auxiliary storage. The non-volatile storage sub-module 761 may not be accessed directly by the CPU 720 without using intermediate area in the memory 740. The non-volatile storage sub-module 761 does not lose data when power is removed and may be two orders of magnitude less costly than storage used in memory module, at the expense of speed and latency. The non-volatile storage sub-module 761 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (761) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/ HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 700 may employ the communication sub-module 762 as a subset of the I/O 760, which may be referred to by a person having ordinary skill in the art as at least one of, but not limited to, computer network, data network, and network. The network allows computing devices 700 to exchange data using connections, which may be known to a person having ordinary skill in the art as data links, between network nodes. The nodes comprise network computer devices 700 that originate, route, and terminate data. The nodes are identified by network addresses and can include a plurality of hosts consistent with the embodiments of a computing device 700. The aforementioned embodiments include, but not limited to personal computers, phones, servers, drones, and networking devices such as, but not limited to, hubs, switches, routers, modems, and firewalls.

Two nodes can be said are networked together, when one computing device 700 is able to exchange information with the other computing device 700, whether or not they have a direct connection with each other. The communication sub-module 762 supports a plurality of applications and services, such as, but not limited to World Wide Web (WWW), digital video and audio, shared use of application and storage computing devices 700, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 762 may comprise a plurality of size, topology, traffic control mechanism and organizational intent. The communication sub-module 762 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 700 may employ the sensors sub-module 763 as a subset of the I/O 760. The sensors sub-module 763 comprises at least one of the devices, modules, and subsystems whose purpose is to detect events or changes in its environment and send the information to the computing device 700. Sensors are sensitive to the measured property, are not sensitive to any property not measured, but may be encountered in its application, and do not significantly influence the measured property. The sensors sub-module 763 may comprise a plurality of digital devices and analog devices, wherein if an analog device is used, an Analog to Digital (A-to-D) converter must be employed to interface the said device with the computing device 700. The sensors may be subject to a plurality of deviations that limit sensor accuracy. The sensors sub-module 763 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 700 may employ the peripherals sub-module 762 as a subset of the I/O 760. The peripheral sub-module 764 comprises ancillary devices uses to put information into and get information out of the computing device 700. There are 3 categories of devices comprising the peripheral sub-module 764, which exist based on their relationship with the computing device 700, input devices, output devices, and input/output devices. Input devices send at least one of data and instructions to the computing device 700. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 700. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 764:

Input Devices
Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 700. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 700 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 700. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 762 sub-module), data storage device (non-volatile storage 761), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

IV. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although some narrow claims are presented herein, it should be recognized the scope of this disclosure is much broader than presented by the claims. It is intended that broader claims will be submitted in an application that claims the benefit of priority from this application.

What is claimed is:

1. A method for remote pneumatic testing of a piping system, the method comprising:
    performing a safety check of the piping system, wherein performing the safety check comprises establishing an exclusion zone, and wherein establishing the exclusion zone comprises:
        determining a geographic area associated with the pneumatic testing,
        creating the exclusion zone around the geographic area for pneumatic testing,
        monitoring the exclusion zone for a breach,
        issuing an alert based upon the breach, and
        modifying the pneumatic testing if the breach is sustained for a pre-determined time period;
    verifying a digital connection between a remote control system and the piping system;
    verifying a mechanical connection between a pressure source and the piping system;
    controlling the disbursement of fluid from the pressure source to apply pressure to the piping system, remotely;
    monitoring the pressure applied to the piping system, remotely;
    determining that a target pressure to the piping system is reached, remotely, and
    responsive to determining that the target pressure is reached, causing a leak check to be performed.

2. The method of claim 1, further comprising:
    responsive to performance of the leak check, releasing pressure from the piping system remotely to terminate pneumatic testing.

3. The method of claim 1, wherein causing the leak check to be performed comprises creating an alert indicating that a user should perform a leak check.

4. The method of claim 1, wherein causing the leak check to be performed comprises receiving, from one or more pressure gauges disposed within the piping system, pressure readings associated with the piping system.

5. A method for remote pneumatic testing of a piping system, the method comprising:
    performing a safety check of the piping system;
    verifying a digital connection between a remote control system and the piping system, wherein verifying the digital connection comprises:
        receiving a first set of data confirming the digital connection,
        responsive to receiving the first set of data confirming the digital connection, sending the first set of data to a blockchain framework, wherein sending the first set of data causes a change in a state of a first smart contract, and
        responsive to the change in the state of the first smart contract, causing a second smart contract to transmit a first permission to proceed with a remote pneumatic testing procedure;

verifying a mechanical connection between a pressure source and the piping system, wherein verifying the mechanical connection comprises:
  receiving a second set of data confirming the mechanical connection,
  responsive to receiving the second set of data, sending the second set of data to the blockchain framework, wherein sending the second set of data causes a change in a state of the second smart contract, and
  responsive to the change in the state of the second smart contract, causing a third smart contract to transmit a second permission to proceed with the remote pneumatic testing procedure;
controlling the disbursement of fluid from the pressure source to apply pressure to the piping system, remotely;
monitoring the pressure applied to the piping system, remotely;
determining that a target pressure to the piping system is reached, remotely, wherein determining that the target pressure is reached comprises:
  receiving a third set of data confirming application of the target pressure to the piping system,
  responsive to receiving the third set of data confirming that the target pressure is applied to the piping system, sending the third set of data to the blockchain framework, wherein sending the third set of data causes a change in a state of a fourth smart contract, and
  responsive to the change in the fourth smart contract, causing submission of a third permission to the remote pneumatic testing procedure to refrain from increasing pressure of the piping system; and
responsive to determining that the target pressure is reached, causing a leak check to be performed.

6. One or more non-transitory computer readable media comprising instructions which, when executed by one or more hardware processors, causes performance of operations comprising:
  performing a safety check of a piping system, wherein performing the safety check comprises establishing an exclusion zone, and wherein establishing the exclusion zone comprises:
    determining a geographic area associated with the pneumatic testing,
    creating the exclusion zone around the geographic area for pneumatic testing,
    monitoring the exclusion zone for a breach,
    issuing an alert based upon the breach, and
    modifying the pneumatic testing if the breach is sustained for a pre-determined time period;
  verifying a digital connection between a remote control system and the piping system;
  verifying a mechanical connection between a pressure source and the piping system;
  controlling the disbursement of fluid from the pressure source to apply pressure to the piping system, remotely;
  monitoring the pressure applied to the piping system, remotely;
  determining that a target pressure to the piping system is reached, remotely, and
  responsive to determining that the target pressure is reached, causing a leak check to be performed.

7. The computer readable media of claim 6, the operations further comprising:
  releasing pressure from the piping system remotely to terminate pneumatic testing.

8. The computer readable media of claim 6, wherein causing the leak check to be performed comprises creating an alert indicating that a user should perform a leak check.

9. The computer readable media of claim 6, wherein causing the leak check to be performed comprises receiving, from one or more pressure gauges disposed within the piping system, pressure readings associated with the piping system.

10. One or more non-transitory computer readable media comprising instructions which, when executed by one or more hardware processors, causes performance of operations comprising:
  performing a safety check of a piping system;
  verifying a digital connection between a remote control system and the piping system, wherein verifying the digital connection comprises:
    receiving a first set of data confirming the digital connection,
    responsive to receiving the first set of data confirming the digital connection, sending the first set of data to a blockchain framework, wherein sending the first set of data causes a change in a state of a first smart contract, and
    responsive to the change in the state of the first smart contract, causing a second smart contract to transmit a first permission to proceed with a remote pneumatic testing procedure;
  verifying a mechanical connection between a pressure source and the piping system, wherein verifying the mechanical connection comprises:
    receiving a second set of data confirming the mechanical connection,
    responsive to receiving the second set of data, sending the second set of data to the blockchain framework, wherein sending the second set of data causes a change in a state of the second smart contract, and
    responsive to the change in the state of the second smart contract, causing a third smart contract to transmit a second permission to proceed with the remote pneumatic testing procedure;
  controlling the disbursement of fluid from the pressure source to apply pressure to the piping system, remotely;
  monitoring the pressure applied to the piping system, remotely;
  determining that a target pressure to the piping system is reached, remotely, wherein determining that the target pressure is reached comprises:
    receiving a third set of data confirming application of the target pressure to the piping system,
    responsive to receiving the third set of data confirming that the target pressure is applied to the piping system, sending the third set of data to the blockchain framework, wherein sending the third set of data causes a change in a state of a fourth smart contract, and
    responsive to the change in the fourth smart contract, causing submission of a third permission to the remote pneumatic testing procedure to refrain from increasing pressure of the piping system; and
  responsive to determining that the target pressure is reached, causing a leak check to be performed.

11. A system comprising:
  at least one device including a hardware processor;
  the system being configured to perform operations comprising:

performing a safety check of a piping system, wherein performing the safety check comprises establishing an exclusion zone, and wherein establishing the exclusion zone comprises:
- determining a geographic area associated with the pneumatic testing,
- creating the exclusion zone around the geographic area for pneumatic testing,
- monitoring the exclusion zone for a breach,
- issuing an alert based upon the breach, and
- modifying the pneumatic testing if the breach is sustained for a pre-determined time period;

verifying a digital connection between a remote control system and the piping system;

verifying a mechanical connection between a pressure source and the piping system;

controlling the disbursement of fluid from the pressure source to apply pressure to the piping system, remotely;

monitoring the pressure applied to the piping system, remotely;

determining that a target pressure to the piping system is reached, remotely, and responsive to determining that the target pressure is reached, causing a leak check to be performed.

12. The system of claim 11, the operations further comprising:
releasing pressure from the piping system remotely to terminate pneumatic testing.

13. The system of claim 11, wherein causing the leak check to be performed comprises creating an alert indicating that a user should perform a leak check.

14. The system of claim 11, wherein causing the leak check to be performed comprises receiving, from one or more pressure gauges disposed within the piping system, pressure readings associated with the piping system.

15. A system comprising:
at least one device including a hardware processor;
the system being configured to perform operations comprising:
performing a safety check of a piping system;
verifying a digital connection between a remote control system and the piping system, wherein verifying the digital connection comprises:
- receiving a first set of data confirming the digital connection,
- responsive to receiving the first set of data confirming the digital connection, sending the first set of data to a blockchain framework, wherein sending the first set of data causes a change in a state of a first smart contract, and
- responsive to the change in the state of the first smart contract, causing a second smart contract to transmit a first permission to proceed with a remote pneumatic testing procedure;

verifying a mechanical connection between a pressure source and the piping system, wherein verifying the mechanical connection comprises:
- receiving a second set of data confirming the mechanical connection,
- responsive to receiving the second set of data, sending the second set of data to the blockchain framework, wherein sending the second set of data causes a change in a state of the second smart contract, and
- responsive to the change in the state of the second smart contract, causing a third smart contract to transmit a second permission to proceed with the remote pneumatic testing procedure;

controlling the disbursement of fluid from the pressure source to apply pressure to the piping system, remotely;

monitoring the pressure applied to the piping system, remotely;

determining that a target pressure to the piping system is reached, remotely, wherein verifying that the target pressure is reached comprises:
- receiving a third set of data confirming application of the target pressure to the piping system,
- responsive to receiving the third set of data confirming that the target pressure is applied to the piping system, sending the third set of data to the blockchain framework, wherein sending the third set of data causes a change in a state of a fourth smart contract, and
- responsive to the change in the fourth smart contract, causing submission of a third permission to the remote pneumatic testing procedure to refrain from increasing pressure of the piping system; and responsive to determining that the target pressure is reached, causing a leak check to be performed.

\* \* \* \* \*